(12) United States Patent
Holt

(10) Patent No.: US 7,930,391 B1
(45) Date of Patent: Apr. 19, 2011

(54) METHOD AND SYSTEM FOR DETERMINING VIEWING TIME OF AN ONLINE VIDEO

(75) Inventor: Brian Holt, San Diego, CA (US)

(73) Assignee: Visible Measures Corp., Boston, MA (US)

( * ) Notice: Subject to any disclaimer, the term of this patent is extended or adjusted under 35 U.S.C. 154(b) by 199 days.

(21) Appl. No.: 12/114,889

(22) Filed: May 5, 2008

Related U.S. Application Data

(60) Provisional application No. 60/915,687, filed on May 3, 2007.

(51) Int. Cl.
*G06F 15/173* (2006.01)
*G06Q 30/00* (2006.01)
*G06F 15/16* (2006.01)
*H04N 7/01* (2006.01)

(52) U.S. Cl. ............... 709/224; 709/217; 705/14.53; 725/36

(58) Field of Classification Search .................. None
See application file for complete search history.

(56) References Cited

U.S. PATENT DOCUMENTS

| | | |
|---|---|---|
| 6,282,548 B1 * | 8/2001 | Burner et al. ................. 1/1 |
| 6,393,479 B1 * | 5/2002 | Glommen et al. ............ 709/224 |
| 6,691,163 B1 * | 2/2004 | Tufts ............................ 709/224 |
| 6,766,370 B2 * | 7/2004 | Glommen et al. ............ 709/224 |
| 6,792,458 B1 * | 9/2004 | Muret et al. ................. 709/224 |
| 7,085,736 B2 * | 8/2006 | Keezer et al. ................ 705/27 |
| 7,159,023 B2 * | 1/2007 | Tufts ............................ 709/224 |
| 7,165,069 B1 * | 1/2007 | Kahle et al. .................. 1/1 |
| 2003/0171977 A1 * | 9/2003 | Singh et al. .................. 705/10 |
| 2004/0049554 A1 * | 3/2004 | Watanabe ..................... 709/217 |
| 2005/0108095 A1 * | 5/2005 | Perlmutter ................... 705/14 |
| 2005/0246651 A1 * | 11/2005 | Krzanowski .................. 715/770 |
| 2006/0048186 A1 * | 3/2006 | Alterman ..................... 725/45 |

* cited by examiner

*Primary Examiner* — Wen-Tai Lin
(74) *Attorney, Agent, or Firm* — David H. Judson

(57) ABSTRACT

A method and system for approximating the viewing time of a video posted on a website of a plurality of websites on the Internet is disclosed herein. The method and system is able to approximate the viewing time of the online video by a visitor computer and transmit the information to a compiling server.

10 Claims, 4 Drawing Sheets

*FIG. 5*

| Today's Top 100 Videos | | | 22 NEW | | How does he miss every 1<br>97,840 views today |
|---|---|---|---|---|---|
| Mar 3, 2007 ▽ All Categories ▽ Any Age ▽ | | | 23 DWN 18 | | Craziest Back Flip Ever<br>95,688 views today |
| 1 SAME | | TuÄŸba Â-zay ve 250.000ci Gara<br>1,339,590 views today | 24 UP 3 | | SNL - Dick in a Box<br>94,472 views today |
| 2 NEW | | UFC 68 - This Saturday Night -<br>928,905 views today | 25 DWN 15 | | Crazy Condom Head Guy<br>89,800 views today |
| 3 UP 9 | | Hamster Dance<br>425,527 views today | 26 UP 3 | | White &Nerdy<br>88,249 views today |
| 4 NEW | | Kellie Pickler Shows Off Her N<br>377,467 views today | 27 UP 4 | | Evolution of Dance<br>86,566 views today |
| 5 DWN 1 | | My Chemical Romance - Famous L<br>334,096 views today | 28 NEW | | Giselle<br>80,953 views today |
| 6 NEW | | Wooden Spoon Prank<br>241,848 views today | 29 DWN 1 | | shoes<br>80,237 views today |
| 7 UP 11 | | World Record Ski Jump<br>206,663 views today | 30 DWN 4 | | Regular Hamburger<br>78,833 views today |
| 8 NEW | | Puppy Two<br>197,056 views today | 31 DWN 25 | | Elmo Releases Sex Tape<br>78,717 views today |
| 9 NEW | | Sister Kate<br>196,614 views today | 32 UP 16 | | Tyra Banks Grabs Katherine McP<br>77,829 views today |
| 10 NEW | | Really Awesome Pong Shots<br>176,442 views today | 33 NEW | | Melanie C - I Want Candy<br>75,830 views today |
| 11 UP 39 | | Cool Stop Motion Head Shaving<br>138,729 views today | 34 UP 7 | | Mike Jones 'Mr.Jones' VIDEO<br>73,470 views today |
| 12 NEW | | Touch Me<br>126,284 views today | 35 UP 10 | | Barbie Girl<br>72,910 views today |
| 13 NEW | | Moms Minivan Vs Old TV<br>124,463 views today | 36 UP 34 | | Mika Grace Kelly<br>70,829 views today |
| 14 UP 2 | | How to Shower: Men vs Women<br>121,887 views today | 37 UP 1 | | Laughing Baby<br>70,412 views today |
| 15 UP 4 | | Avril Lavigne - Girlfriend<br>115,643 views today | 38 UP 15 | | Young Buck f/ 50 Cent - "HOLD<br>67,261 views today |
| 16 UP 45 | | Blades Of Glory<br>109,692 views today | 39 DWN 30 | | Look at his rolling skillz!<br>67,238 views today |
| 17 UP 25 | | Gangsta Happy Feet Remix<br>104,355 views today | 40 UP 6 | | Paris Hilton<br>66,992 views today |
| 18 UP 16 | | Justin Timberlake - What Goes<br>102,596 views today | 41 UP 39 | | Bellyqueen 2006 Promo<br>63,440 views today |
| 19 NEW | | Kid Slams Face First Into Conc<br>100,696 views today | 42 UP 214 | | The Vanishing Lover<br>60,930 views today |
| 20 UP 19 | | Anna Nicole Smith and a Typica<br>99,789 views today | 43 UP 100 | | shakira y beyonce Beautiful<br>60,868 views today |
| 21 UP 4 | | 300 Trailer Video<br>97,865 views today | 1 - 50 | 51 - 100 | 101 - 150 | 151 - 200 | | |

METHOD AND SYSTEM FOR DETERMINING VIEWING TIME OF AN ONLINE VIDEO

This application is based on and claims priority from Ser. No. 60/915,687, filed May 3, 2007.

This application includes subject matter protected by copyright.

BACKGROUND OF THE INVENTION

1. Field of the Invention

The present invention is generally related to determining a viewing time of an online video posted on a website. More specifically, the present invention relates to determining how much time a visitor computer views an online video posted on website.

2. Description of the Related Art

Recently, the number of professional and amateur videos posted on websites throughout the Internet has substantially increased along with the popularity of viewing such professional and amateur videos. Several factors may be responsible for this substantial increase including the creation of websites dedicated to promoting such professional and amateur videos.

Alternan, U.S. Patent Publication Number 2006/0048186, for a Method And Apparatus For Storing And Accessing Videos From A Remote Location discloses an application service platform that allows websites to accept video uploads, and which also includes a method for tracking the number of times the video was accessed or viewed on the website.

Tufts, U.S. Pat. No. 7,159,023, for a Use Of Web Usage Trail Data To Identify Relationships Between Browsable Items, discloses a method for determining related links to a website using usage trails of a population of users that have accessed the website.

Tufts, U.S. Pat. No. 6,691,163, for a Use Of Web Usage Trail Data To Identify RelatedLinks, discloses a method for determining related links to a website using usage trails of a population of users that have accessed the website.

Kahle et al., U.S. Pat. No. 7,165,069, for an Analysis Of Search Activities Of Users To Identify Related Network Sites, discloses a system and method for identifying related network sites by accumulating search activity data and analyzing the search activity data.

Glommen et al., U.S. Pat. No. 6,766,370, for an Internet Website Traffic Flow Analysis Using Timestamp Data, discloses using a cookie which is small enough to pass from server to browser without negatively affecting performance in order to generate a time duration of a current sequence of requested documents by a network browser.

Krzanowski, U.S. Patent Publication Number 2005/0246651, for a System, Method And Apparatus For Selecting, Displaying, Managing, Tracking And Transferring Access To Content Of Web Pages And Other Sources, discloses the previous in regard to web pages including online videos.

Muret et al., U.S. Pat. No. 6,792,458, for a System And Method For Monitoring And Analyzing Internet Traffic, discloses using a log engine with log files to monitor hits from visitors to a website.

Glommen et al., U.S. Pat. No. 6,393,479, for an Internet Website Traffic Flow Analysis, discloses using a cookie which is small enough to pass from server to browser without negatively affecting performance in order to generate a real-time traffic at the site.

Burner et al., U.S. Pat. No. 6,282,548, for an Automatically Generate And Displaying Metadata As Supplemental Information Concurrently With The Web Page, There Being No Link Between Web Page And Metadata, discloses determining a web page address which is sent to a metadata server and displayed.

Keezer et al., U.S. Pat. No. 7,085,736, for Rules Based Identification Of Items Represented On Web Pages, discloses using a document object model of a web page to extract data from a website.

Many websites provide a "total" number of traffic received by a given item on their website—where an "item" can be a video file, audio file, web page, downloadable file, article; and where "traffic" can be page views, downloads, incoming links, or plays.

Singh et al., U.S. Patent Publication Number 2003/0171977, for a Clickstream Analysis Methods And Systems, discloses modifying off-line businesses based on identified characteristics obtained by online actions.

Most websites fail to state the time or date over which the traffic was received. This is because doing so would require additional programming, doing so would consume unnecessary disk space and processing time, and/or such information may not be important to the site owners.

This information, however, can be important to other parties. For example, determining traffic over time of a video or article may be important to advertisers and promoters interested in determining Internet trends.

Where previously a web item resided on only one website, the recent exposition of media hosting websites has given rise to a large redundancy of similar/identical files on different websites. This redundancy creates a demand for a method to aggregate traffic information from different websites about a similar item in order to determine the traffic of that item across the entire Internet. However, the prior art has failed to provide a means to address this problem.

The Internet also allows for websites to distribute a much larger selection of content than other methods of distribution such as stores, radio, and television. Because of this, traffic to items (such as video files, audio files, web pages, downloads, articles, or sales) on a website or group of websites fit into a "long tail distribution" where the highest ranked items each receive a very large amount of traffic while the vast majority of the lesser ranked items each receive relatively little traffic. Where "traffic" can be a view, a download, a link, or a sale. When graphed with the traffic to each item plotted on the y-axis and the items ranked by popularity on the x-axis, the curve formed can be approximated by the equation $y=ab^{cx}$ for $x>0$, where a and b are positive constants and c is a negative constant.

While it is possible to get an exact count of such a website's traffic, there are many problems in attempting to do so. First, because such a website can potentially receive tens of millions of viewers per day, it is technologically impractical to get an exact count of traffic by recording every view since doing so would dramatically increase the required disk space and processing power of the server. Second, a third-party cannot get an exact count of a website's traffic without requiring that website to add various forms of code it the website. Many websites are reluctant to add such codes to their website because it decreases the loading speed and creates possible security threats.

Another problem associated with videos on the Internet is approximating standard viewership over multiple websites. There are many Internet video hosts and a single video may be hosted on several of these sites. Because of this, it becomes useful to aggregate the statistics from all of these websites to determine the overall viewership of a video. Different video websites, however, have different criteria for determining viewership, particularly a "view" or "play," and this creates a need to weight numbers from the various sites based on their criteria. For example, a first web site may register one view every time the video page is visited, a second web site may register one view only the first time a person visits the video page, and a third web site may only register one view once the video is played to the end. The prior art has failed to provide a solution to this problem.

BRIEF SUMMARY OF THE INVENTION

The subject matter described herein provides a method and system for determining viewing time for online videos posted on the websites throughout the Internet.

This disclosure describes a technique to determine how long a video has been played. A goal is to provide information to video producers about how long their online videos are being played.

In one embodiment, a video is embedded in a webpage. Once the user stops playing the video or leaves the page, the video player (usually a FLASH™ player) prompts the user to send a request (usually an HTTP request) to a server containing the point at which the video was stopped or the user left. Selected users are requested to download a client program. This program preferably runs in the background of the user's computer and is activated anytime the user watches a video through his or her web browser or through a video player. Once the video is stopped, the client sends a request to a compiling server containing the play length. Preferably, this operation is done without interfering with the user's experience.

The play length of a video can be estimated by calculating the time a user spent on a web page containing an embedded video. This can be done in a number of different ways. First, when a client enters a page, his or her browser is prompted (e.g., by a Flash, HTML, or JavaScript code) to send an HTTP request to a server that compiles the information. Once the user leaves the page, his or her browser is prompted to send another request. The compiling server calculates the difference between requests and estimates that as the play time. Second, the user's computer marks the time on which a page is entered and upon exiting sends a request containing the time spent on page. Third, a log file containing the time at which a user accessed a series of pages can be kept on either the video host's server or the compiler server. This is automatically done with HTTP server software such as Apache. The difference in time between accessing a first page and a second page can be estimated as the time spent on a page and thus the time in which a video was played. If the estimated on-page time is greater than the length of the video, it can be estimated that the video was watched to the end. If the estimated time on page is unreasonably long, that time can be discarded.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE DRAWINGS

FIG. 5 is a graphical display of a list of popular videos.

DETAILED DESCRIPTION OF THE INVENTION

Figure 1:
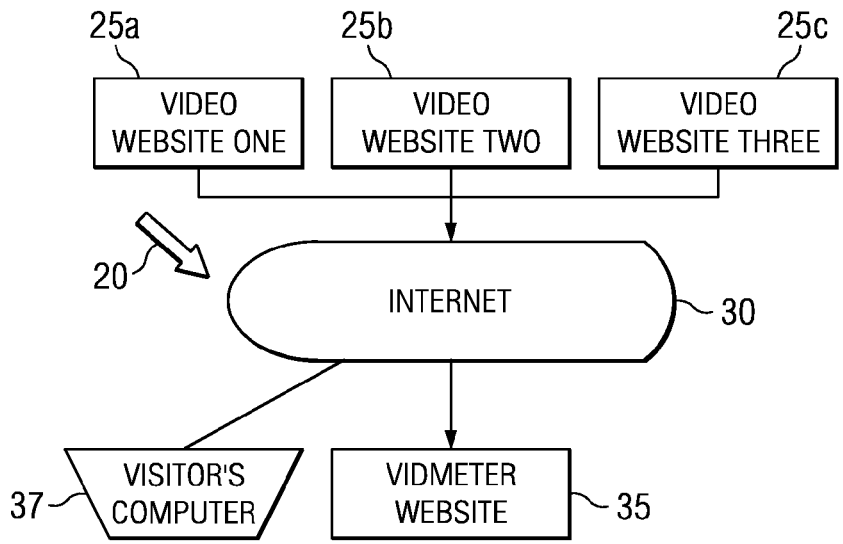
FIG. 1 is a block diagram of a system in which the disclosed subject matter may be practiced.

As shown in FIG. 1, a system of this disclosure is generally designated 20. The system 20 preferably includes a plurality of websites 25a-25c, the Internet 30 and a main website 35. Each of the plurality of websites 25a-c has a video posted for viewing by visitors of the website. The video typically has a uniform resource locator (hereinafter "URL") for each posting on the website. A website 25 may have the same video posted at several different URLs. A visitor's computer 37 accesses the Internet 30 to access a website 25 to view an online video.

Figure 2:
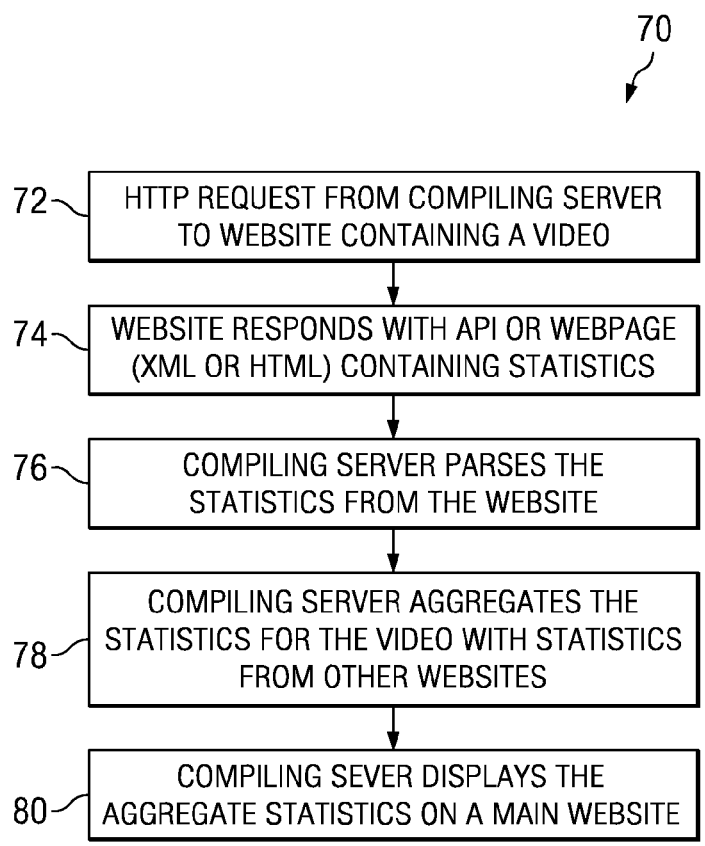
FIG. 2 is a flow chart of a general method of the described subject matter.

As shown in FIG. 2, a general method is generally designated 70. At block 72, a compiling server sends a HTTP request to a website containing a video. At block 74, the website responds with an API or webpage (XML or HTML) containing statistics for the video. At block 76, the compiling server parses the statistics from the website. At block 78, the compiling server aggregates the statistics for the video with statistics from other websites. At block 80, the compiling server displays the aggregates statistics on a main website, which is associated with the compiling server. This information may be used with an approximation of the viewing times for a particular online video.

Figure 3:
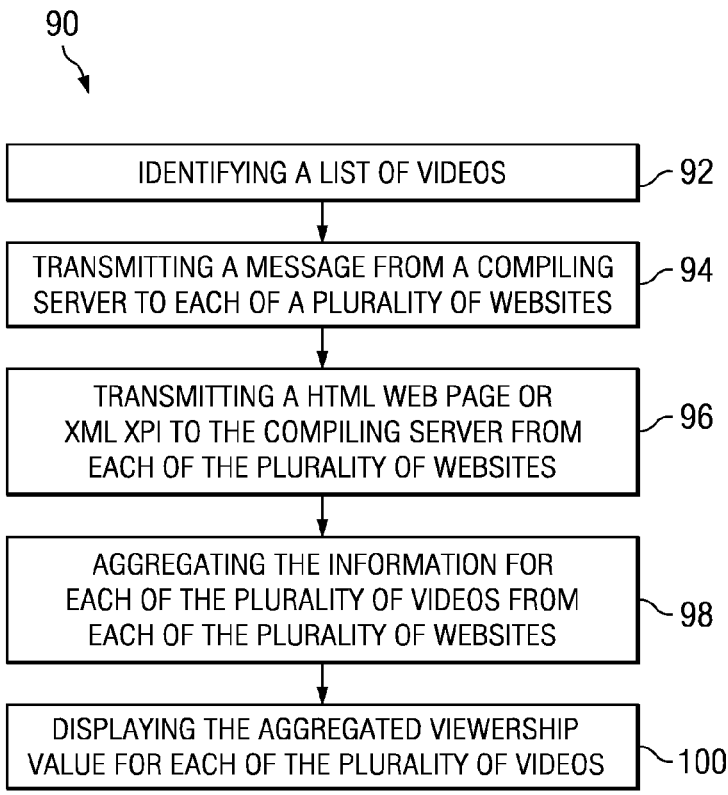
FIG. 3 is a flow chart of a specific method of the disclosure.

As shown in FIG. 3, a more specific method is generally designated 90. At block 92, a list of a plurality of videos to be analyzed is identified either using a software program searching for similar files characteristics or through human selection. At block 94, a compiling server sends a request to multiple websites concerning a video on the list. The request is sent to the video host's website requesting information about the video. Usually this request is sent over the HTTP protocol. At block 96, each website will send an HTTP response containing the pertinent information. Usually this response is either an HTML web page or an XML XPI. Usually the information is the view count, comment count, and incoming link count to a video. At block 98, the compiling server aggregates the information from each of the multiple websites about the video on each website with similar information about similar videos on other websites to create an aggregated viewership value for the video. At block 100, the aggregated viewership value is displayed on a website associated with the compiling server. The aggregate information may also be shared via a web browser plug-in. When a user visits a website containing a video, the compiling server can determine if the video in question is on a list of aggregated videos. If so, the compiling server can return the aggregated information about that video representing its traffic across the Internet. This information may be used with an approximation of the viewing times for a particular online video.

Figure 4:
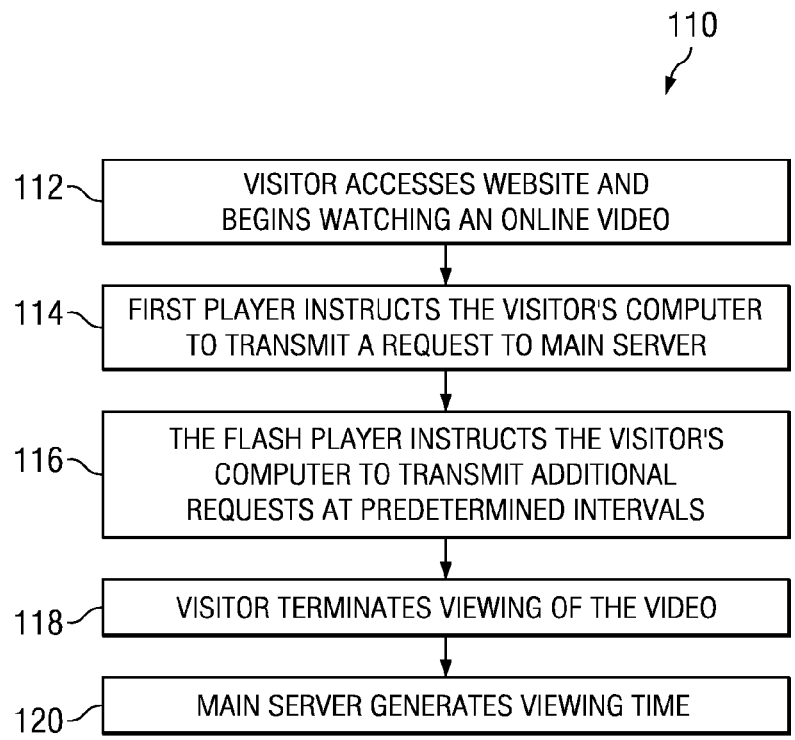
FIG. 4 is a flow chart of a specific method of the disclosure.
Figure 6:
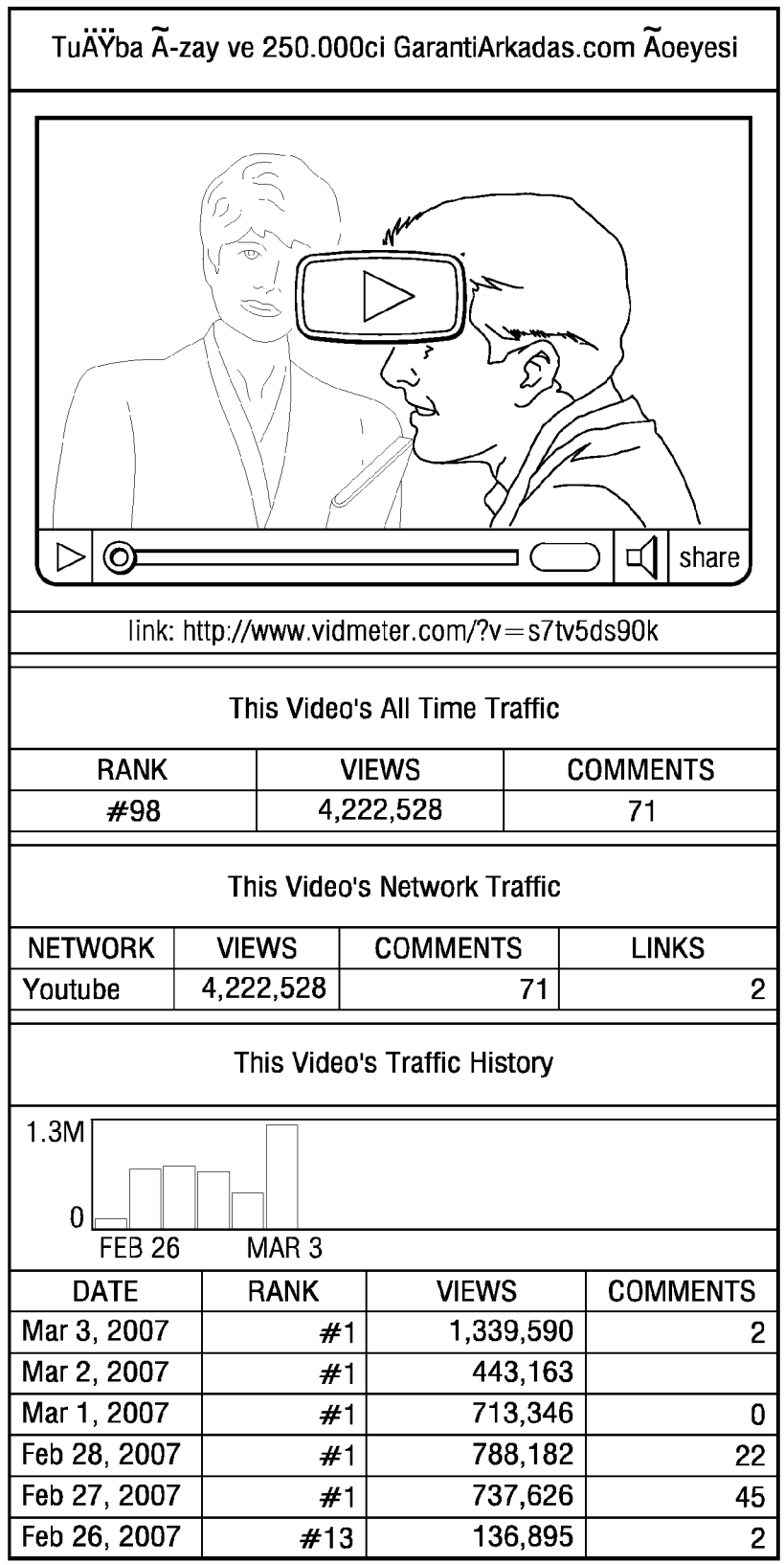
FIG. 6 is a graphical display of information related to a popular online video.

As shown in FIG. 4, a more specific method is generally designated 110. The method 110 is for approximating the length of time a viewer has watched an online video. At block 112, a visitor accesses a website containing an online video and begins watching the online video. The online video is typically a Flash video embedded on an HTML page, although the techniques described in this disclosure are not limited to any particular streaming or other media delivery format. At block 114, a player instructs the visitor's computer to send a request to a main or compiling server. The request is preferably a HTTP request, although other transport protocols may be used. Typically, the request contains information stating that the video has begun and is being viewed at the visitor's computer. At block 116, the player instructs the visitor's computer to send additional requests to the main server at predetermined intervals. The predetermined intervals are preferably a predetermined time interval such as every five seconds, every ten seconds, every thirty seconds or every sixty seconds. Alternatively, the requests are sent at predetermined divisions of the online video such as every tenth of the online video length, every fifth of the online video length, every quarter of the online video length, or the like. At block 118, the visitor terminates viewing the online video. Either the viewer has finished viewing the entire online video or has terminated the viewing prior to the completion of the online video. If the visitor terminates viewing prior to completion of the online video, the main server estimates the viewing time, e.g., based on the previously sent requests at the predetermined intervals. If the viewer views the entire online video, then the player sends a request to the main server that the entire video has been viewed. At block 120, the main server generates a viewing time for this visitor's viewing of the online video. The viewing time of the one visitor may be compiled with the viewing times of other visitors to generate a total viewing time for the online video over a predetermined time frame. This information may be utilized to place a financial value on the particular online video, which then may be used for marketing and selling advertising that is or will be placed during, before or after the online video.

The following code sample is an example implementation of the disclosed subject matter to determine actual viewer video viewing time. Traditional measurement techniques measure "hits" or page views by firing off javascript calls (or the like) generally once per web page, or by processing server logs. The challenge with determining the level of user interaction with an interactive application such as video is that the majority of the interaction occurs within the client, whether it is a Adobe Flash, Microsoft Silverlight, Windows desktop, Mac application, peer-to-peer, or other video implementation. By combining user-driven event calls from the video player with logic to signal when the user is skipping or rewinding over particular segments of the video file or stream, it is possible to measure the actual "captive" viewing time that the user experiences with the video. Example code for performing this function for a Flash player is set forth below (© 2008 Visible Measures Corp.):

```
//DECLARATIONS
var loaderWidth:Number=350.2;
//Insert width of the loader
var soundBarWidth:Number=24.9;
//Insert width of the volume bar
var duration:Number;
//saves duration of flv
this.createEmptyMovieClip("vFrame", this.getNextHighestDepth( ); //creates blank movie clip for use in scrubber
vFrame.on EnterFrame=vidStatus;
//on EnterFrame means consistant calling of vidStatus for constant updating
var finalLink:String=flvLink;
//link of flv taken from html embed code
var   sw:Number=System.capabilities.screenResolutionX;
//screen res width
var   sh:Number=System.capabilities.screenResolutionY;
//screen res height
var playerUrl=_url;
//url of flash swf
var session=sessionGenerator( );
//generate random 40char session ID each startup
var pastStatus:Number=0;
//saves last status number sent in http request
var nc:NetConnection=new NetConnection( )
//creates new Netconnection object
nc.connect(null);
var ns:NetStream=new NetStream(nc);
//attach NetStream object to Netconnection object
ns.setBufferTime(15);
//Load 15 seconds of flv before continuing playback
tubeHolder_mc.tubeViewer_mc.attachVideo(ns);
//attach Netstream to MovieClip on Stage
//PICLOADER FOR STATIC FLV PIC
var movLoader:MovieClipLoader=new MovieClipLoader( )
//instantiate new movieClipLoader Object
var mcListener:Object=new Object( )
//create listener object
movLoader.addListener(mcListener);
//attach listener to loader
//function: On inital load, resize the image to proper height and width(425×350)
//mcListener automatically passed the instance name of the movieClip its listening to.
mcListener.on LoadInit=function(target_mc)
{
target_mc._width=425;
target_mc._height=350;
//PLAY BUTTON FUNCTIONALITY
//function:play button functionality
play_btn.onRelease=function( )
{
   if(this._currentframe==1)
//if past the first second of film, then change to pause sign
   {
   this.gotoAndStop(2);
   }
   else
//else keep play sign showing
   {
   this.gotoAndStop(1);
   }
   if(staticPicHolder_mc._visible==true)
//if play is hit and static flv pic shown, hide it
   {
   staticPicHolder_mc._visible=false;
   }
   ns.pause( )
   //if playing netstream will pause, if paused, netstream will play
}
//function: functionality for play button which overlays the static picture,
//onRelease will do what the main play button does
staticPicHolder_mc.play_btn.onRelease=function( )
{
   play_btn.onRelease( )
}
tubeHolder_mc.attachAudio(ns);
//attaches audio netstream to the MovieClip that holds the netstream
s=new Sound(tubeHolder_mc);
//instanciates new sound object
s.setVolume(Math.round((soundBar_mc.sndScrubber_mc._x/38)*100));//setsVolume to x value of the sound Scrubber
//SOUND SCRUBBER FUNCTIONALITY
//function: when SndScrubber_mc is pressed, start dragging it and only allow x movement, not y.
soundBar_mc.sndScrubber_mc.onPress=function( )
{
```

```
this.startDrag(false,   0,   this._y,soundBarWidth,this._y);
//range of x movement is:0-soundBarWidth
}
//function: on Release, and on Release outside of area, stop
dragging
soundBar_mc.sndScrubber_mc.onRelease=soundBar_mc.
sndScrubber_mc.onReleaseOutside=function( )
{
   this.stopDrag( )
   //stop dragging
   soundBar_mc.barColor_mc._width=soundBar_mc.snd-
Scrubber_mc._x;
     //expand color bar to the x coordinate of sound scruber
     s.setVolume(Math.round((soundBar_mc.sndScrubber_
mc._x/soundBarWidth)*100));
    //set volume to x coord/width*100
}
//function: when a hidden bar called clickBar(same width+
height of soundbar) is released, or releasedOutside,
//move sound scrubber to the spot of click and set color bar to
that width.
soundBar_mc.clickBar2_mc.onRelease=soundBar_mc.
clickBar2_mc.onReleaseOutside=function(   )//mute    bar
functionality
{
if(this._xmouse>soundBarWidth)
//if x coordinate of Mouse is out of bounds
   {
   soundBar_mc.sndScrubber_mc._x=soundBarWidth;
//set sound scrubber x position to width of sound bar
   }
   else if(this._xmouse <0)
//if x coord is less then 0, and therefore out of bounds
   {
   soundBar_mc.sndScrubber_mc._x=0;
//set sound scrubber x position to 0, mute
   }
   else{
   soundBar_mc.sndScrubber_mc._x=this._xmouse;
//else, must not be out of bounds, and move sound scrubber to
mouse position
   }
   soundBar_mc.barColor_mc._width=soundBar_mc.snd-
Scrubber_mc._x;
//set color bar width to x position of sound scrubber
   s.setVolume(Math.round((soundBar_mc.sndScrubber_
mc._x/38)*100));
//set volume to x coord/width*100
}
//NETSTREAM FUNCTIONS
//function: when receive meta data of FLV, save it
ns.on MetaData=function(obj)
{
duration=obj.duration;
}
//function: When receive codes from netstream object, do the
following:
ns.on Status=function(infoObject:Object) {
   if (infoObject.code=="NetStream.Play.Start")
//When receive start msg, call sendStatus and pass status of 1
   {
   setStatus(1);
   }
   if (infoObject.code=="NetStream.Play.Stop" && pastSta-
tus !=4)
//when receive stop msg, call sendStatus and pass status of 4
   {
   setStatus(4);
   pastStatus=4;
//save status to var for error checking
   }
}
//function: vidStatus sends status info during playback,sta-
tus=2 and 3, and error checks so theres no backtracking
//i.e.: no sending past error codes, if status being sent is less
then a status already sent,
//then it prevents a request from being sent
//vidStatus is called by on EnterFrame event of the blank
movie clip vFrame, on EnterFrame allows for constant updat-
ing
function vidStatus( )
{
   amtLoaded=ns.bytesLoaded/ns.bytesTotal;
//amtloaded takes ratio of how much is loaded/total.
   loader_mc.loadBar_mc._width=amtLoaded*loaderWidth;
//set load bar width to amtloaded*width of loader
   if(ns.time >=1 && pastStatus <2)
//if time of flv is greater or equal to 1 second, and pastStatus
is less then 2
   {
   setStatus(2);
//call sendStatus and pass status of 2
   pastStatus=2;
//save status number for future checking
   }
   if(ns.time >=duration/2 && pastStatus <3 && duration
>0)//if flv time is past half way point, pastStatus is less then 3,
and duration exists
   {
   setStatus(3);
//call sendStatus and pass status of 3
   pastStatus=3;
//save status for future checking
   }
   if(duration >ns.time)
//when duration is greater then time of flv
   {
   loader_mc.scrubber_mc._x=(Math.round(ns.time/
duration*loaderWidth)); //move scrubber according to time
   }
}
//SCRUBBER FUNCTIONALITY
//function: when clickBar within loader_mc is released, or
released outside, set x position of flv scrubber to
//click position, and set volume and color bar accordingly.
loader_mc.clickBar_mc.onRelease=loader_mc.clickBar_
mc.onReleaseOutside=function( )
{
   if(this._xmouse>loaderWidth)
//if x coordinate of Mouse is out of bounds
   {
   loader_mc.scrubber_mc._x=loaderWidth;
//set flv scrubber x to end of bar
   scrubMover( )
//call scrubMover,which moves flv to appropriate position
   }
   else if(this._xmouse <0)
//if x coordinate of Mouse is out of bounds
   {
   loader_mc.scrubber_mc._x=0;
//set flv scrubber to x coord 0
   scrubMover( )
//call scrubMover,which moves flv to appropriate position
   }
```

```
        else{
    loader_mc.scrubber_mc._x=this._xmouse;
//Otherwise scrubber position to position of mouse
    scrubMover( )
    //call scrubMover,which moves flv to appropriate position
    }
{
//function: when flv scrubber pressed, allow dragging, and set
on Enterframe status
//of blank movieClip to scrubMover to allow seeking of flv
while dragging
loader_mc.scrubber_mc.onPress=function( )
{
    vFrame.on EnterFrame=scrubMover;
    //scrubMover called repeatedly(allowing constant update)
since its set as an on EnterFrame
    this.startDrag(false, 0, this._y,loaderWidth,this._y); //al-
low dragging along x-axis
}
//function: when flv scrubber release, or released outside,
allow dragging, and set on Enterframe status
//of blank movieClip to vidStatus to allow constant updating
of status of the flv playback.
loader_mc.scrubber_mc.onRelease=loader_mc.scrubber_
mc.onReleaseOutside=function( )
{
    vFrame.on EnterFrame=vidStatus; //allows constant check
of time against when to send http requests
    this.stopDrag( )
    //stop Dragging
}
//function: function is called when flv scrubber is released,
and will seek to position of flv where scrubber is.
function scrubMover( )
{
ns.seek(Math.floor((loader_mc.scrubber_mc._x/(loader-
Width)*(duration))));//seek flv to position of scrubber
}
//function: generate random session ID, composed of random
amt of numbers and letters totalling 40 . . .
function sessionGenerator( )
{
var session:String=" ";
var letterArray:Array=["A", "B", "C", "D", "E", "F", "G",
"H", "I", "J", "K", "L", "M", "N", "O", "P", "Q", "R", "S",
"T", "U", "V", "W", "X", "Z"];
    for(i=0; i<40; i++)
    {
    if(Math.randomQ*1>0.5) //if
random number greater then 0.5 then add Letter, else add
number
    {
    session+=Math.floor(Math.random( )9).toString( )
    }
    else
    {
    session+=letterArray[Math.floor(Math.random( )letterAr-
        ray.length)];
    }
    }
    return(session);
}
//function: accepts a status number, and sends http request
along with user info listed below function setStatus(status-
Vid)
{
    var sender:LoadVars=new LoadVarsQ;
//instanciate sender LoadVars object, holds values for user
info
    var taker:LoadVars=new LoadVars( )
//instanciate taker LoadVars object, accepts server response,
servers as a dummy here
    if(statusVid==1)
//if status=1, attach flvLink and embedUrl to sender object
    {
    sender.flvLink=flvLink;
    sender.embedUrl=htmlLink;
    }
    //attach:
    sender.sw=sw;
//screen width
    sender.sh=sh;
//screen height
    sender.session=session;
//generated session number
    sender.videoID=videoID;
//videoID from html embed code
    sender.status=statusVid;
//passed statusVid number, 1,2,3,4
    sender.remotevid=1;
//beginning of http request
    sender.sendAndLoad("http://www.vidmeter.com/",taker,
"GET");
//send all variables to vidmeter.com, taker accepts response,
use GET
}
//function:initializes video player on its first load, checks for
autoplay
function init( )
{
    if(AutoPlay=="false" && pastStatus==0) //if Autoplay is
false, and no status number has been passed:
    {
    staticPicHolder_mc.play_btn.gotoAndStop("overlay-
Play_btn");
//set Play button to overlay style over the static picture.
    movLoader.loadClip(flvStaticPic,staticPicHolder_mc-
.staticPic_mc);
//load static pic into proper movieclip
    ns.play(finalLink);
//start playing flv link
    ns.seek(0);
//seek to the beginning
    ns.pause( );
//pause flv
    }
    else
//if autoplay is false:
    {
    play_btn.gotoAndStop("_pause");
//set play button to pause state
    staticPicHolder_mc._visible=false;
//hide static pic
    ns.play(finalLink);
//start playback of flv
    }
}
init( );
//start initialization process
    From the foregoing it is believed that those skilled in the
pertinent art will recognize the meritorious advancement of
this invention and will readily understand that while the
present invention has been described in association with a
preferred embodiment thereof, and other embodiments illus-
``` trated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

The hardware and software systems in which the invention is illustrated are merely representative. The invention may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation of the present invention. A given machine includes network interfaces and software to connect the machine to a network in the usual manner. The server may be part of a managed service (e.g., in an ASP model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

Having now described my invention, what I claim is as follows:

1. An apparatus for approximating viewing time of a video posted on a website on the Internet, comprising:
   a processor;
   computer memory holding computer program instructions executed by the processor to:
   receive an initial request from a visitor computer indicating that a user associated with the visitor computer has begun to view the video;
   as the video is being viewed, receive one or more subsequent requests, each of the subsequent requests transmitted at predetermined intervals from the visitor computer and indicating that the user associated with the visitor computer is still viewing the video at the predetermined interval;
   upon termination of viewing of the video by the visitor computer, generate a viewing time for the visitor computer based on the initial request and the one or more subsequent requests; and
   adjusting the viewing time for the user skipping or rewinding over particular segments of the video to generate a captive viewing time.

2. The apparatus according to claim 1 wherein the computer program instructions executed by the processor receive a final request indicating that the visitor computer has viewed the video in its entirety.

3. The apparatus according to claim 1 wherein the predetermined interval for transmitting a subsequent request is configurable temporally.

4. The apparatus according to claim 1 wherein the predetermined interval for transmitting a subsequent request is configurable as a percentage of a length of the video.

5. The apparatus according to claim 1 wherein the initial request and each of the plurality of subsequent requests is an HTTP request.

6. A computer-implemented method for calculating an amount of time a video is being played on a website, comprising:
   receiving, at a server, a first HTTP request from a browser when a viewer enters a page for a video, the first HTTP request indicating the beginning of the viewing session;
   receiving, at the server, a plurality of one or more subsequent HTTP requests from the browser at predetermined time intervals at the video is being viewed, each of the plurality of subsequent HTTP requests informing the server that the video still is being viewed at the predetermined interval;
   upon receiving an indication that the video viewing has terminated, generating a viewing time based on the first HTTP request and the plurality of one or more subsequent HTTP requests; and
   adjusting the viewing time for the user skipping or rewinding over particular segments of the video to generate a captive viewing time.

7. The method according to claim 6 further including the step of comparing a viewing time period to a threshold viewing time period to determine if the video has been viewed for a given time period.

8. The method according to claim 6 wherein further including receiving at the server a final request indicating that the video has been viewed in its entirety.

9. The method according to claim 6 wherein the predetermined interval for transmitting a subsequent request is configurable temporally.

10. The method according to claim 6 wherein the predetermined interval for transmitting a subsequent request is configurable as a percentage of a length of the video.

* * * * *